United States Patent
Chong et al.

(10) Patent No.: US 6,657,959 B1
(45) Date of Patent: Dec. 2, 2003

(54) SYSTEMS AND METHODS FOR IMPLEMENTING ABR WITH GUARANTEED MCR

(75) Inventors: Simon Chong, Fremont, CA (US); Ryszard Bleszynski, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/335,223

(22) Filed: Jun. 17, 1999

Related U.S. Application Data (60) Provisional application No. 60/090,939, filed on Jun. 27, 1998.

(51) Int. Cl.[7] .............................................. H04L 12/26
(52) U.S. Cl. ............................... 370/230.1; 370/395.4; 370/412
(58) Field of Search ................................ 370/412–468, 370/230.1, 230, 233, 234, 253, 395.4, 395.43

(56) References Cited

U.S. PATENT DOCUMENTS

| | | |
|---|---|---|
| 4,024,507 A | 5/1977 | Berkling et al. |
| 4,586,134 A | 4/1986 | Norstedt |
| 4,700,294 A | 10/1987 | Haynes |
| 5,218,687 A | 6/1993 | Ducousso et al. |
| 5,287,537 A | 2/1994 | Newmark et al. |
| 5,295,135 A | 3/1994 | Kammerl |
| 5,379,297 A | 1/1995 | Glover et al. |
| 5,394,402 A | 2/1995 | Ross |
| 5,414,707 A | 5/1995 | Johnston et al. |
| 5,481,536 A | 1/1996 | Reisch et al. |
| 5,515,370 A | 5/1996 | Rau |
| 5,517,488 A | 5/1996 | Miyazaki et al. |

(List continued on next page.)

OTHER PUBLICATIONS

Ghani, N. et al. *Hierarchical Scheduling For Integrated ABR/VBR Services In ATM Networks,* GLOBECOMM '97 IEEE, Global Telecommunications Conference 1997, pp. 779–784, vol. 2.

(List continued on next page.)

*Primary Examiner*—Melvin Marcelo
*Assistant Examiner*—Nhat Do
(74) *Attorney, Agent, or Firm*—Blakely, Sokoloff, Taylor & Zafman LLP (57) ABSTRACT

Systems and methods for maintaining cell transmissions at or above the minimum cell transfer rate for ABR-category VCs. An ABR schedule table (AST) in a memory stores ABR VCs scheduled for transmissions. A pointer to the AST indicates that the ABR VC currently addresses is ready to transmit a cell. The schedule pointer is incremented every cell transmission time. When a cell of a particular VC is sent, the VC is rescheduled in another time slot in the AST such that the next cell for that VC is transmitted at close to or equal to that VC's allowed cell transfer rate (ACR) while maintaining its minimum cell transfer rate (MCR). To determine the next time slot in which to reschedule the VC, the system uses an ACR bitmap that compresses the AST and which identifies entries that are not occupied by a VC scheduled for a transmission. The system determines the time slot in the AST that would allow the VC to be transmitted at its ACR. The system then checks the ACR bitmap to determine whether that ACR slot is unoccupied. If occupied, the system searches the ACR bitmap to locate the next empty slot in the AST. If all slots between the ACR slot and the slot which provides for an MCR transmission for that VC are occupied, the system searches an MCR bitmap, which compresses the AST, to determine which VC occupying the AST between the ACR slot and the MCR slot is to be replaced by the VC being rescheduled. The VC that is replaced is itself rescheduled. In this manner MCR is guaranteed for a VC being rescheduled.

13 Claims, 6 Drawing Sheets

U.S. PATENT DOCUMENTS

| | | | |
|---|---|---|---|
| 5,535,201 A | | 7/1996 | Zheng |
| 5,539,729 A | | 7/1996 | Bodnar |
| 5,555,256 A | | 9/1996 | Calamvokis |
| 5,555,265 A | | 9/1996 | Kakuma et al. |
| 5,564,051 A | | 10/1996 | Halliwell et al. |
| 5,574,875 A | | 11/1996 | Stansfield et al. |
| 5,590,128 A | | 12/1996 | Maloney et al. |
| 5,619,650 A | | 4/1997 | Bach et al. |
| 5,638,371 A | | 6/1997 | Raychaudhuri et al. |
| 5,640,399 A | | 6/1997 | Rostoker et al. |
| 5,652,872 A | | 7/1997 | Richter et al. |
| 5,659,794 A | | 8/1997 | Caldarale et al. |
| 5,664,116 A | | 9/1997 | Gaytan et al. |
| 5,684,797 A | | 11/1997 | Aznar et al. |
| 5,684,954 A | | 11/1997 | Kaiserwerth et al. |
| 5,696,930 A | | 12/1997 | Garetz et al. |
| 5,701,300 A | | 12/1997 | Jeon et al. |
| 5,726,985 A | | 3/1998 | Daniel et al. |
| 5,740,171 A | | 4/1998 | Mazzola et al. |
| 5,742,772 A | | 4/1998 | Sreenan |
| 5,745,477 A | * | 4/1998 | Zheng et al. ............... 370/230 |
| 5,745,790 A | | 4/1998 | Oskouy |
| 5,748,630 A | | 5/1998 | Bergantino et al. |
| 5,751,709 A | * | 5/1998 | Rathnavelu ............. 370/395.4 |
| 5,751,951 A | | 5/1998 | Osborne et al. |
| 5,751,955 A | | 5/1998 | Sonnier et al. |
| 5,754,530 A | | 5/1998 | Awdeh et al. |
| 5,764,895 A | | 6/1998 | Chung |
| 5,771,231 A | | 6/1998 | Watanabe |
| 5,796,715 A | | 8/1998 | Patterson et al. |
| 5,796,978 A | | 8/1998 | Yoshioka et al. |
| 5,805,805 A | | 9/1998 | Civanlar et al. |
| 5,812,550 A | | 9/1998 | Sohn et al. |
| 5,825,765 A | | 10/1998 | Menzilcioglu et al. |
| 5,835,928 A | | 11/1998 | Auslander et al. |
| 5,841,772 A | | 11/1998 | Daniel et al. |
| 5,848,068 A | | 12/1998 | Daniel et al. |
| 5,857,075 A | | 1/1999 | Chung |
| 5,867,712 A | | 2/1999 | Shaw et al. |
| 5,870,561 A | | 2/1999 | Jarvis et al. |
| 5,875,173 A | * | 2/1999 | Ohgane et al. ............. 370/230 |
| 5,878,232 A | | 3/1999 | Marimuthu |
| 5,905,874 A | | 5/1999 | Johnson |
| 5,909,441 A | | 6/1999 | Alexander, Jr. et al. |
| 5,910,955 A | | 6/1999 | Nishimura et al. |
| 5,912,892 A | | 6/1999 | Barnhart et al. |
| 5,935,249 A | | 8/1999 | Stern et al. |
| 5,943,693 A | | 8/1999 | Barth |
| 5,956,336 A | | 9/1999 | Loschke et al. |
| 5,974,457 A | | 10/1999 | Waclawsky et al. |
| 5,974,462 A | | 10/1999 | Aman et al. |
| 5,978,951 A | | 11/1999 | Lawler et al. |
| 5,983,332 A | | 11/1999 | Watkins |
| 5,991,854 A | | 11/1999 | Watkins |
| 6,003,027 A | | 12/1999 | Prager |
| 6,005,943 A | | 12/1999 | Cohen et al. |
| 6,021,263 A | | 2/2000 | Kujoory et al. |
| 6,041,059 A | * | 3/2000 | Joffe et al. .................. 370/412 |
| 6,052,383 A | | 4/2000 | Stoner et al. |
| 6,058,434 A | | 5/2000 | Wilt et al. |
| 6,073,175 A | | 6/2000 | Tavs et al. |
| 6,085,252 A | | 7/2000 | Zhu et al. |
| 6,104,700 A | | 8/2000 | Haddock et al. |
| 6,119,170 A | | 9/2000 | Schoffelman et al. |
| 6,144,996 A | | 11/2000 | Starnes et al. |
| 6,147,975 A | | 11/2000 | Bowman-Amuah |
| 6,154,776 A | | 11/2000 | Martin |
| 6,163,541 A | | 12/2000 | Casey et al. |
| 6,167,049 A | * | 12/2000 | Pei et al. .................... 370/412 |
| 6,172,991 B1 | | 1/2001 | Mori |
| 6,195,697 B1 | | 2/2001 | Bowman-Amuah |
| 6,198,751 B1 | | 3/2001 | Dorsey et al. |
| 6,201,971 B1 | | 3/2001 | Purnadi et al. |
| 6,223,292 B1 | | 4/2001 | Dean et al. |
| 6,269,396 B1 | | 7/2001 | Shah et al. |
| 6,272,544 B1 | | 8/2001 | Mullen |
| 6,285,674 B1 | | 9/2001 | Soni et al. |
| 6,285,684 B1 | | 9/2001 | Suzuki et al. |
| 6,311,212 B1 | | 10/2001 | Chong et al. |
| 6,311,238 B1 | | 10/2001 | Hebert |
| 6,337,863 B1 | | 1/2002 | Nair et al. |
| 6,343,078 B1 | | 1/2002 | Bronstein et al. |
| 6,411,625 B1 | | 6/2002 | Furuhashi et al. |
| 6,425,067 B1 | | 7/2002 | Chong et al. |
| 6,452,923 B1 | | 9/2002 | Gerzberg et al. |

OTHER PUBLICATIONS

Lin, D., et al., *Constant–time Dynamic ATM Bandwith Scheduling For Guaranteed And Best Effort Services With Overbooking,* INFOCOMM '97 IEEE, Sixteenth Annual Joint Conference Of The IEEE Computer And Communications Societies, Driving The Information Revolution, pp. 398–405, vol. 2.

Chiussi, F. et al. *Virtual Queuing Techniques For ABR Service: Improving ABR/VBR Interaction,* INFOCOMM '97 IEEE, Sixteenth Annual Joint Conference Of The IEEE Computer And Communications Societies, Driving The Information Revolution, pp. 406–418, vol. 2.

Benmohamed, L. et al., *A Control–theoretic ABR Explicit Rate Algorithm For ATM Switches With Per–VC Queuing,* INFOCOMM '98 IEEE, Seventeenth Annual Joint Conference Of The IEEE Computer And Communications Societies, pp. 183–191, vol. 1.

* cited by examiner

FIG. 1

$t_{S+1} - t_S = k \cdot \text{Cell\_Rate}$ where:
  k = positive integer
  $0 <= S <$ Max Vc
  S = Number of time slots the
      time VC is due for transmission

VCw with MCR/=0 kicks out VCa

FIG. 4

VCw with MCR=0 re-schedule beyond MCR

FIG. 5

SYSTEMS AND METHODS FOR IMPLEMENTING ABR WITH GUARANTEED MCR

CROSS-REFERENCES TO RELATED APPLICATIONS

This application is related to U.S. Provisional Patent Application Ser. No. 60/090,939, filed Jun. 27, 1998, entitled "Network Accelerator Subsystem Based on Single-Chip Network Processor and Interface Protocol," the disclosure of which is hereby incorporated by reference in its entirety.

BACKGROUND OF THE INVENTION

The present invention relates in general to traffic scheduling in networking systems, and more particularly to supporting the Available Bit Rate (ABR) service category with guaranteed Minimum Cell Rate (MCR) transmissions in an Asynchronous Transfer Mode (ATM) networking system.

The need for faster communication among computers and other systems requires ever faster and more efficient networks. Today, networks typically use an amalgam of various software and hardware to implement a variety of network functions and standards. Network devices such as client computer systems, servers, hubs, routers, switches, network backbones, etc., are each complex devices that require digital processing in hardware and software to facilitate network communication. Some tasks performed in a network device include translation between different network standards such as Ethernet and ATM, reformatting data, traffic scheduling, routing data cells, packets messages, etc. Depending on the particular protocol being implemented, some tasks may be performed at different points in the network.

In conventional networking systems that implement ATM, data traffic is handled by a Virtual Channel, or Virtual Connection (VC). There are typically many VCs in each system and each VC has its own characteristics, such as packet type, packet size and protocols. For each VC, a descriptor which identifies the particular VC and its characteristics and requirements is stored in a memory. When a scheduler determines that a particular VC is ready for transmission, the VC descriptor is accessed and processed.

When scheduling transmissions for many VCs, several service categories are typically available, including Constant Bit Rate (CBR), Variable Bit Rate (VBR) and Available Bit Rate (ABR). The ABR category typically has the lowest priority, meaning that one or more CBR or VBR VCs may be transmitted before an ABR VC that is scheduled for transmission. In the ABR service category, a source may send cells at any rate between the Minimum Cell Rate (MCR) and the Allowed cell rate (ACR). Thus, for the ABR service category, it is desirable to transmit cells at rates close to or equal to the ACR for each VC while guaranteeing transmissions at the MCR lower bound rate for each VC.

SUMMARY OF THE INVENTION

The present invention provides novel techniques for guaranteeing MCR transmissions for ABR-category VCs. In particular, the techniques of the present invention provide for enhanced scheduling capabilities and increased throughput.

According to the invention, systems and methods are provided for maintaining cell transmissions at or above the minimum cell transfer rate for ABR-category VCs. An ABR schedule table (AST) in a memory stores ABR VCs scheduled for transmissions. A pointer to the AST indicates that the ABR VC currently addresses is ready to transmit a cell. The schedule pointer is incremented every cell transmission time. When a cell of a particular VC is sent, the VC is rescheduled in another time slot in the AST such that the next cell for that VC is transmitted at close to or equal to that VC's allowed cell transfer rate (ACR) while maintaining its minimum cell transfer rate (MCR). To determine the next time slot in which to reschedule the VC, the system uses an ACR bitmap that compresses the AST and which identifies entries that are not occupied by a VC scheduled for a transmission. The system determines the time slot in the AST that would allow the VC to be transmitted at its ACR. The system then checks the ACR bitmap to determine whether that ACR slot is unoccupied. If occupied, the system searches the ACR bitmap to locate the next empty slot in the AST. If all slots between the ACR slot and the slot which provides for an MCR transmission for that VC are occupied, the system searches an MCR bitmap, which compresses the AST, to determine which VC occupying the AST between the ACR slot and the MCR slot is to be replaced by the VC being rescheduled. The VC that is replaced is itself rescheduled. In this manner MCR is guaranteed for a VC being rescheduled.

According to an aspect of the invention, a method is provided for maintaining a transmission of cells at a minimum rate or above for each of a plurality of virtual connections (VCs) in a networking system device having a transmitting engine and a transmission schedule table for the plurality of VCs. The schedule table includes a plurality of entries, wherein each entry represents a time interval for transmission of a cell for a VC, and wherein the entries are continuously read in a sequential order to determine which VC is scheduled for a cell transmission during each time interval. The method typically comprises the steps of reading a first entry in the schedule table so as to identify a first VC scheduled for a cell transmission, and transmitting a cell for the first VC. The method also typically includes the step of rescheduling another cell transmission for the first VC based on an available cell rate (ACR) and a minimum cell rate (MCR) allowable for the first VC so as to maintain transmission of cells for the first VC at the MCR rate or above for the first VC.

According to another aspect of the invention, a networking system device coupled to one or more networks is provided. The device typically comprises a local memory for storing a schedule table having a plurality of entries, wherein each entry represents a time interval for transmission of a cell for a VC, and a network processor. The network processor typically includes a first and a second bitmap, each including a plurality of entries, wherein each first and second bitmap entry corresponds to an entry in the schedule table, wherein each first bitmap entry identifies whether the corresponding entry in the schedule table is occupied by a VC, and wherein each second bitmap entry identifies whether any VC occupying the corresponding entry in the schedule table has a minimum cell rate (MCR). The network processor also typically includes a transmit processor, coupled to the local memory and the first and second bitmaps, wherein the transmit processor reads a first entry in the schedule table to identify a first VC scheduled for a cell transmission, wherein the transmit processor transmits a cell for the first VC, and wherein the transmit processor reschedules another cell transmission for the first VC in the schedule table based on an available cell rate (ACR) and an MCR allowable for the first VC so as to maintain transmission of cells for the first VC at the MCR or above for the first VC.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

DESCRIPTION OF THE SPECIFIC EMBODIMENTS

Figure 1:
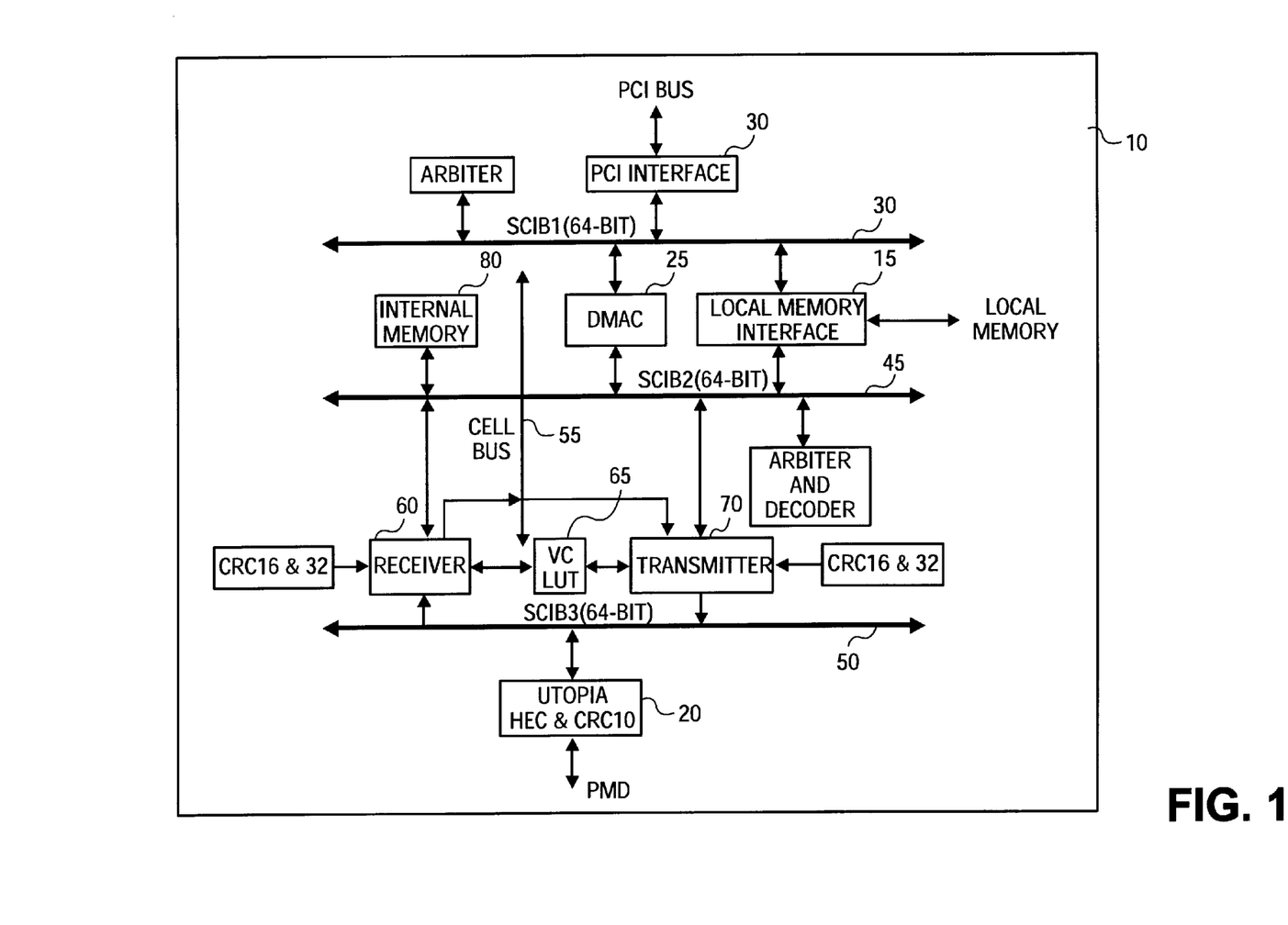
FIG. 1 is a block diagram of the architecture of a network processing engine according to an embodiment of the present invention.

FIG. 1 is a block diagram of the architecture of a network processing engine 10 according to an embodiment of the present invention. In preferred aspects, the network processing engine of the present invention is useful for a variety of network communications applications including implementation in multi-protocol network interface cards (NICs), server NICs, workgroup, IP and ATM switches, multi-protocol and IP routers, ATM backbone switch applications, multi-protocol and multi-protocol/ATM adapters and the like. In preferred aspects, all components of processing engine 10 reside on a single chip (e.g., a single silicon chip), but all components may be spread across many chips such that processing engine 10 is implemented using many chips. Processing engine 10 includes a local memory interface block 15, UTOPIA interface 20, Direct Memory Access Controller (DMAC) 25, PCI interface 30, first internal bus 40, second internal bus 45, third internal bus 50, and cell bus 55. Processing engine 10 also includes an internal memory 80 and a receiver block 60 and a transmitter block 70 for processing incoming and outgoing data transmissions, respectively, over a communications interface, such as UTOPIA interface 20. Local memory interface block 15 provides a connection to a local, off-chip system memory, such as DRAM, SRAM, SDRAM, SSRAM or any combination thereof. DMAC 25 provides control of data transfers between external memories (PCI), internal memory 80 and the local memory. Internal memory 80 is used in one embodiment to store VC descriptors on-chip for fast access of the VC descriptors. Additionally, in one embodiment, internal memory 80 stores ACR and MCR bitmaps to provide enhanced traffic scheduling capabilities as will be described below in more detail.

PCI interface 30 provides a connection to external intelligence, such as a host computer system, and external packet memories. First and second internal buses 40 and 45 in one embodiment are non-multiplexed 32 bit address and 64 bit data buses. Depending on the desired line rate, PCI interface 30 is configured to run at frequencies up to 33 MHz over a 32 bit PCI bus, or at frequencies up to 66 MHz over a 64 bit PCI bus. For example, to achieve a 622 Mbps line rate, a 64 bit interface is used with frequencies up to 66 MHz. UTOPIA interface 20 supports connections to a broad range of layer 1 physical interfaces, including, for example, OC-1, OC-3, OC-12, OC-48, OC-192 and DS-3 interfaces and the like. To support a 622 Mbps line rate, the UTOPIA data bus is 16 bits, whereas for a 155 Mbps line rate the UTOPIA bus is 8 bits. Third internal data bus 50 is an 8 or 16 bit UTOPIA compatible interface. Cell bus 55 is a 64 bit data path and is used to transfer cells or frames between internal cell/frame buffers of receiver block 60 and transmitter block 70 and the PCI memory space through DMAC 25. Cell bus 55 allows several transactions to occur in parallel. For example, data payload transfers and descriptor data movement may occur simultaneously. Additionally, for a 622 Mbps line rate, cell bus 55 is capable of off-loading up to 160 MBps of bandwidth from local memory.

Figure 2:
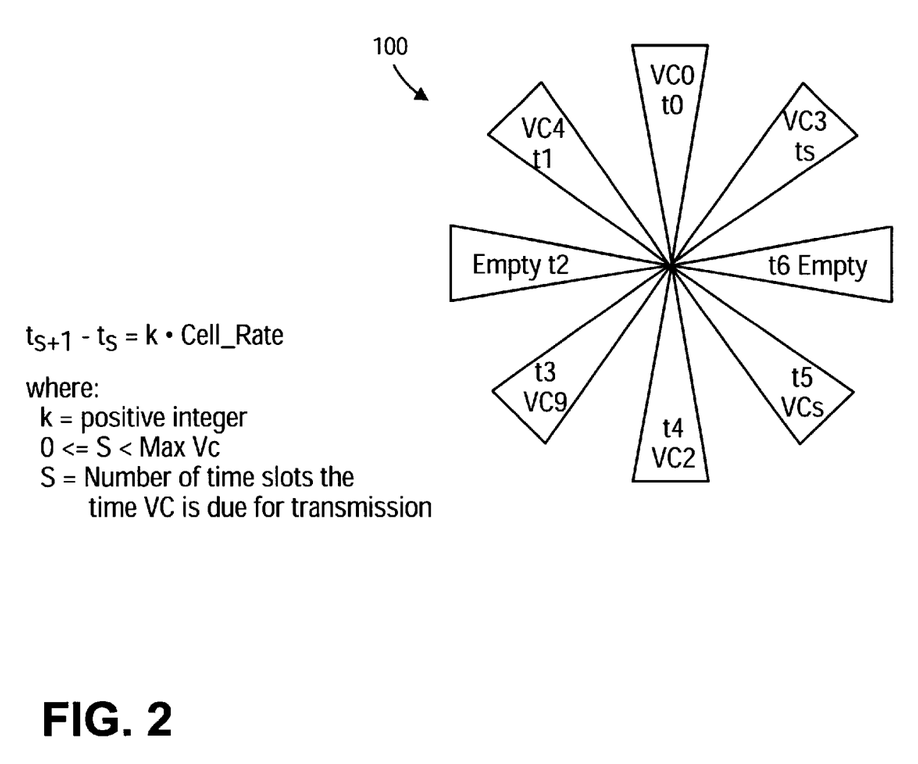
FIG. 2 is a simplified diagram of a timing wheel representative of a traffic scheduling technique according to an embodiment of the present invention.

FIG. 2 is a simplified diagram of a timing wheel 100 representative of a traffic scheduling technique according to an embodiment of the present invention. In preferred aspects, timing wheel 100 is physically represented as a table of ABR VCs in local memory 80 as will be described in more detail below. In this implementation, a schedule pointer (not shown) pointing to the table indicates that the VC identified in the table entry currently addressed is ready to transmit a cell. In one embodiment, the schedule pointer is implemented in a separate scheduler module (not shown) connected to transmit engine 70. Alternately, the schedule pointer and scheduler are implemented as part of transmitter engine 70. Each entry, $t_0$–$t_s$, represents a time interval for transmission of a cell by transmitter engine 70. Referring to FIG. 2, assume that the schedule pointer points to the entry $t_0$, which identifies $VC_0$. Information about $VC_0$ is communicated to transmitter engine 70 and transmitter engine proceeds to transmit a cell for $VC_0$. Additionally, the schedule pointer is incremented to point to the next entry, in this case entry $t_1$, which identifies $VC_1$. The schedule pointer is incremented every time interval to point to the next entry in the table. When the last entry, $t_S$, is reached, the schedule pointer is incremented to point to the beginning entry, i.e., the process is repeated beginning at the first entry, to. Depending on the line rates used, the time interval will vary accordingly. For example, for an OC-12 line rate, the schedule pointer will be incremented every 675 ns, and for an OC-3 line rate, the schedule pointer is incremented every 2.7 μs.

After a cell for a particular VC has been transmitted by transmitter engine 70, that particular VC is rescheduled for another transmission. The next time slot (i.e., time that a cell may be sent) for that particular VC is scheduled by computing how far down the schedule table (i.e., where on the timing wheel) the particular VC should be written. The computation is based on the ACR and the MCR for that particular VC and on the line rate, for example a 2.7 μs or a 675 ns time interval per entry, such that cells are sent at rates close to or equal to the ACR while maintaining the MCR lower bound.

The MCR and ACR for each VC are generally negotiated between the end-systems and the network(s). The ACR is a rate negotiated such that the actual cell rate sent by the end-system on the ABR connection need never exceed the ACR. The MCR is a rate negotiated such that the actual cell rate sent by the end-system on the ABR connection is not less than the MCR. The MCR agreed to between the end-systems and the network(s) carrying the connection may range from 0 to the maximum value supported by the network(s). However, it is preferred that the actual cell rate is not less than about 1 cell per second when the MCR is equal to 0.

In one embodiment, the ACR and MCR information is received by the network processor 10 in a resource management (RM) cell as is well known. Each time a backward RM cell arrives, the receiver engine 60 buffers the RM cell in local memory or in internal memory 80. The RM cells are processed to determine if a rate change is necessary. Rate change information is provided in the RM cells.

Figure 3A:
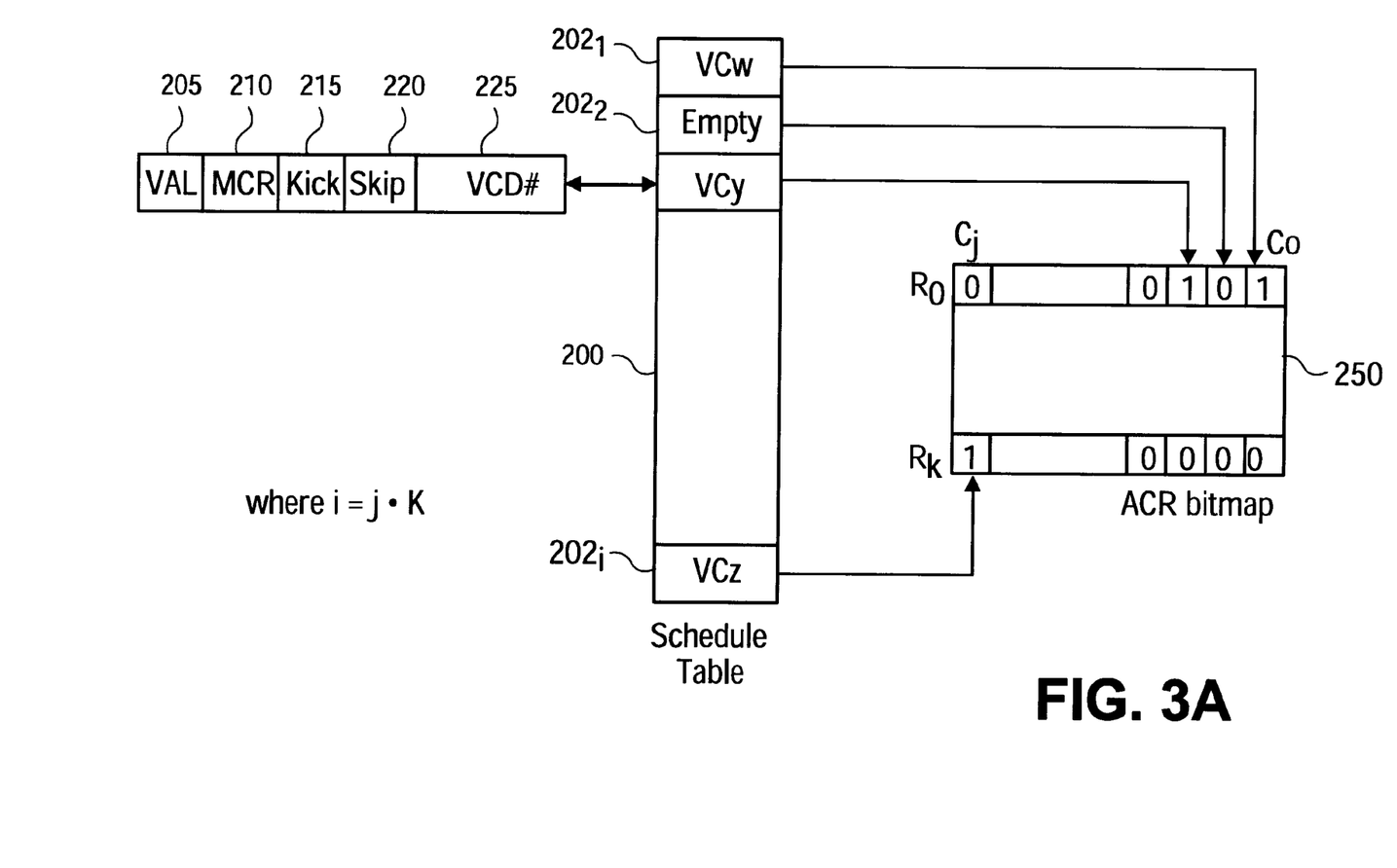
FIG. 3a shows an ABR schedule table and an associated ACR bitmap according to an embodiment of the present invention.
Figure 3B:
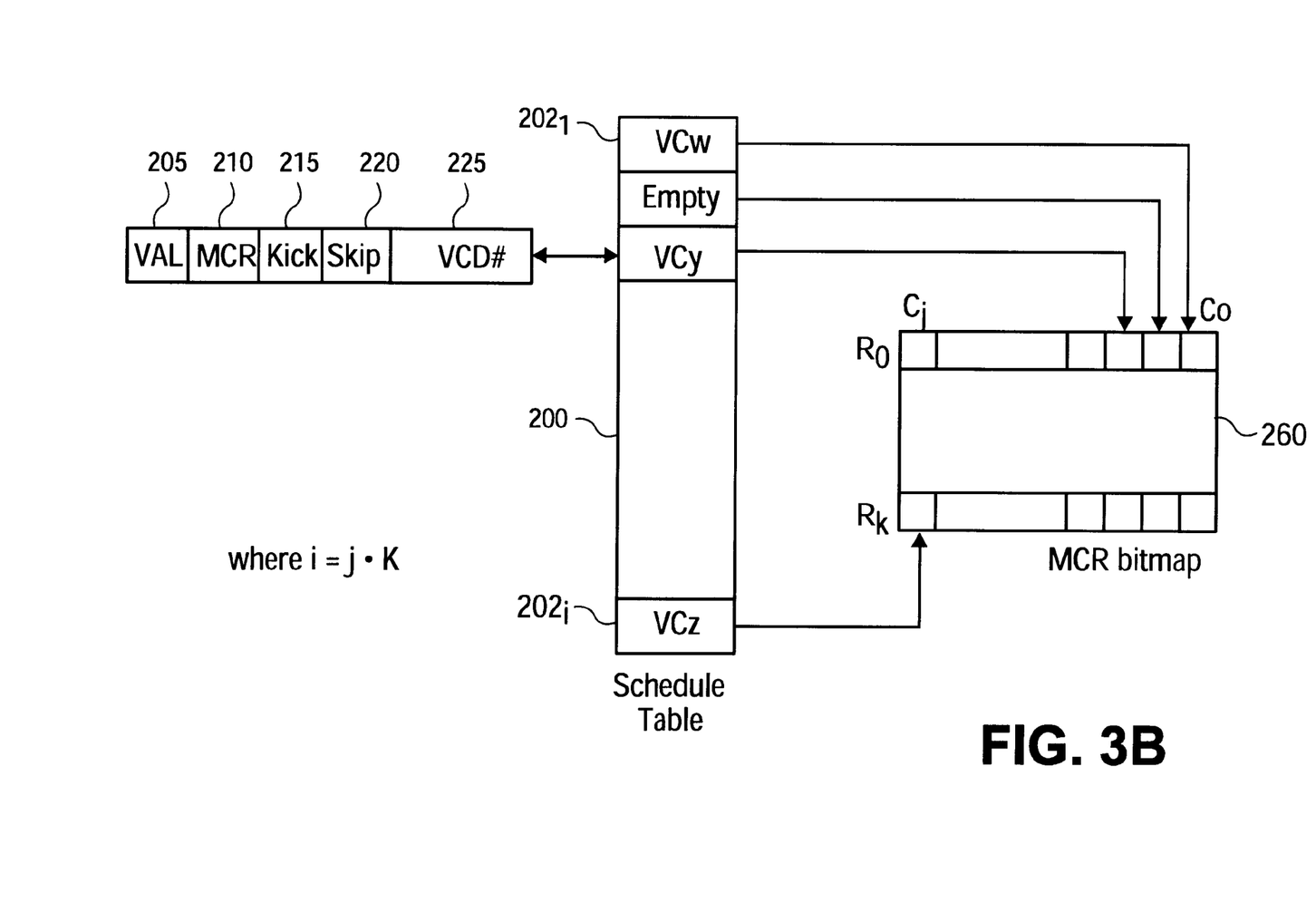
FIG. 3b shows the ABR schedule table and an associated MCR bitmap according to an embodiment of the present invention.

FIGS. 3a and 3b show an ABR schedule table 200 and an associated ACR bitmap 250 and an associated MCR bitmap 260, respectively, according to an embodiment of the present invention. As shown, each entry 202 in the schedule table preferably includes a Val field 205, an MCR field 210, a Kick field 215, a Skip field 220 and a VC Descriptor Pointer (VCD#) field 225. Val field 205 includes a valid bit that indicates whether the entry is valid; e.g., if a VC is scheduled in the entry, the valid bit is set to 1, and if there is no VC scheduled in the entry, the valid bit is set to 0. VCD# field 225 includes the transmit descriptor pointer, which identifies the particular VC that is scheduled for a transmission in the time slot. The transmit descriptor pointer is used by transmitter engine 70 to access and process the identified VC descriptor from internal memory 80 or local memory. Skip field 220 indicates the number of rotations in the time wheel that the identified VC is to be skipped before the identified VC is ready for transmission. Kick field 215 indicates whether the identified VC is able to be kicked out of the time slot. MCR field 210 is used to indicate whether the identified VC has an MCR. MCR field 210 includes an MCR bit which is set to 0 if the MCR for the identified VC is 0. Otherwise, the MCR bit is set to 1 if the identified VC has an MCR different from 0.

With reference to FIG. 3a, each of the entries, $202_1$, to $202_i$, in schedule table 200 has a corresponding entry in ACR bitmap 250. For each entry 202 in ABR schedule table 200, the corresponding bit in ACR bitmap 250 indicates whether the entry (i.e., slot on time wheel 100) is empty or not. If an entry is empty, which means that there is no VC scheduled in that slot, the corresponding value in ACR bitmap is 0. If an entry is occupied, indicating that a VC is scheduled for a transmission in that slot, the corresponding value in the ACR bitmap is 1. With reference to FIG. 3b, each of the entries, $202_1$, to $202_i$, in schedule table 200 also has a corresponding entry in MCR bitmap 260. The corresponding bit in MCR bitmap 260 indicates whether the associated VC is kickable. Generally, if the MCR bit is 0, the VC can be kicked out of the schedule table slot, and if the MCR bit is 1, the VC cannot be kicked out. In preferred aspects, a VC can be kicked out of the time slot only when the associated Skip value is not equal to 0.

In preferred aspects, ACR bitmap 250 and MCR bitmap 260 are implemented in internal memory 80 for fast access and processing. The memory space required for each bitmap is relatively small, as each entry in the schedule table requires only 1 bit in each bitmap.

In operation, every time the schedule pointer is incremented to point to the next entry in ABR schedule table 200, the corresponding bit in ACR bitmap 250 is read. If the bit in ACR bitmap 250 is set to 1, the system reads the ABR schedule table entry from local memory and checks the Skip field. If the Skip field is not equal to 0, indicating that the identified VC is not ready for a cell transmission, the Skip value is subtracted by 1 and the ABR schedule table entry is written back to local memory. If the value of the Skip field is 0, it is time for a transmission for the identified VC. Transmitter engine 70 proceeds to transmit a cell for the identified VC. After a cell transmission has occurred for the identified VC, the system reschedules the VC according to the ACR and MCR for that particular VC.

After the transmission of a cell for a VC, transmitter engine 70 reschedules the VC based on the ACR and the MCR for that VC. It is desirable that the actual cell transfer rate (ACTR) is as close to the ACR as possible. For each VC, the system (e.g., a processor portion of transmitter engine 70 or a local host processor) determines a number, S, of time slots required to place the VC for its next transmission time, where S is defined by the equation $t_{S+1}-t_S=$ACR * line rate. For example, for an OC-12 line rate, $t_{S+1}-t_S=$ACR * 675 ns. Once S is computed, transmitter engine 70 checks ACR bitmap 250 to determine if the identified time slot is available. Generally, S is equal to the number of time slots that provides transmissions at the ACR. The time slot is not available if another VC occupies the time slot.

According to the invention, the system checks ACR bitmap 250 to determine if the time slot identified by S is available. If the slot is not available, ACR bitmap 250 is searched for the next available time slot. In general, if there is at least one available time slot between the ACR value and the MCR value, the VC is scheduled in that time slot. The original ACR bitmap and MCR bitmap bit locations associated with the VC being rescheduled are cleared and the new bit location in ACR bitmap 250 corresponding to the slot filled by the VC being rescheduled is set to 1. The new location in MCR bitmap 260 corresponding to the slot filled by the VC being rescheduled is set only if that VC is kickable. Also, the entry for the VC being rescheduled in schedule table 200 is moved to the new position and updated accordingly.

When the time slot identified by S in the time wheel is not available, the search algorithm finds the next available slot. Suppose, however, that the next available slot is 100 positions away from the slot identified by S. If the next cell sent out 6.75$\mu$ (100 * 675 ns, with an OC-12 line rate) later than the current ACTR rate, the MCR may be violated. According to an embodiment of the present invention, when the MCR field 210 in schedule table 200 is not equal to 0 for the VC being rescheduled, a second parameter, SM, is computed by substituting the MCR value into the rate equation: $t_{SM+1}-t_{SM}=$MCR * cell rate. The MCR bitmap row and column values are written by the processor into the row and column values. During the search for the next available slot, a condition is provided that the search does not go beyond the limitation of the MCR. If the ACR row and column numbers are not equal to the MCR row and column numbers, the search continues. However, if the ACR row and column numbers are equal to the MCR row and column numbers, the search stops and the processor is interrupted with an error condition that the MCR guarantee has been violated. An example of pseudocode for this condition is as follows:

if ACTR[Rx,Cy]≠MCTR[Rx,Cy]
        Then search continues
    Else, if ACR[Rx,Cy]=MCR[Rx,Cy]
        Then search ends and interrupt generated.

The use of Kick field 215 now becomes apparent. Kick field 215 guards against the case where the same VC is repeatedly kicked out. When a VC is kicked out of a slot, the VC is placed in another slot with its Kick field value incremented by 1. When the kick field reaches a predefined value, this VC cannot be kicked out again. In one embodiment, the predefined value is programmable based on the number of times around the timing wheel, which is determined based on the rate of the physical layer interface (e.g., OC-3, OC-12, OC-48 and OC-192) and the size of the timing wheel RAM.

Figure 4:
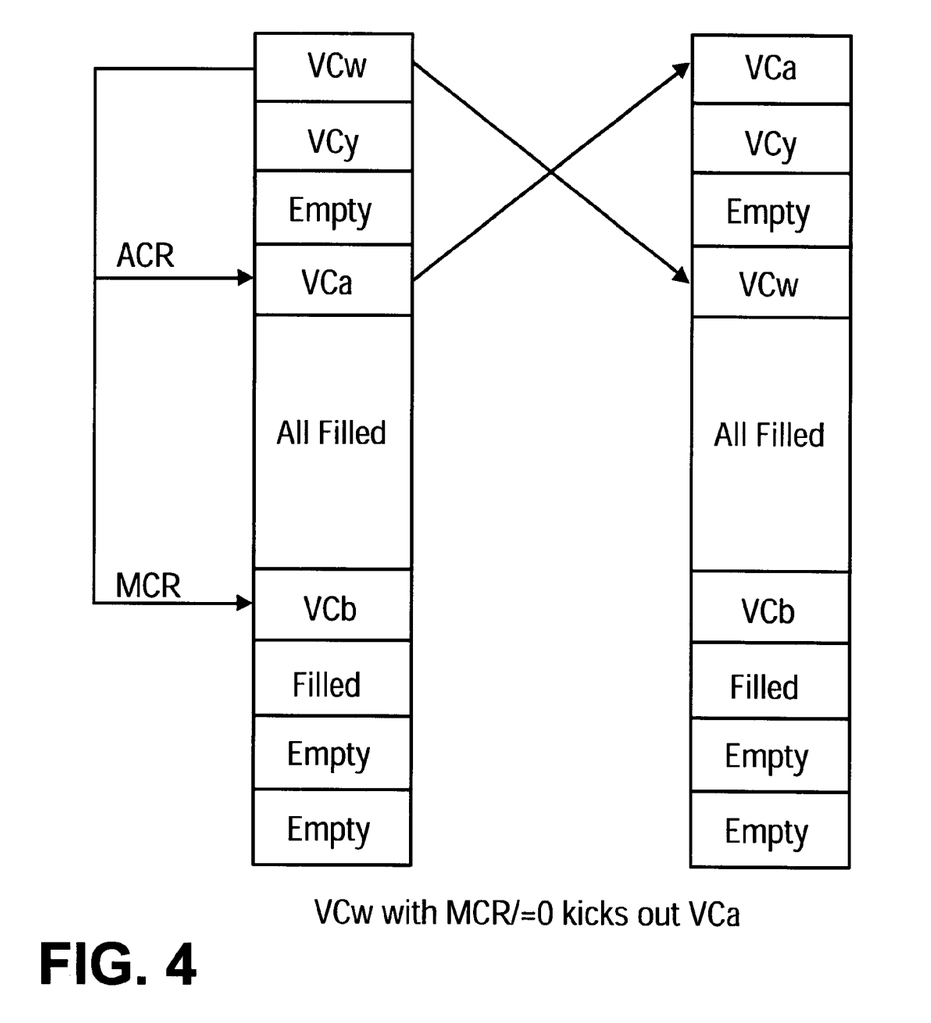
FIG. 4 shows an example of a VC being rescheduled when the MCR for the VC being rescheduled is not equal to 0 according to an embodiment of the present invention.
Figure 5:
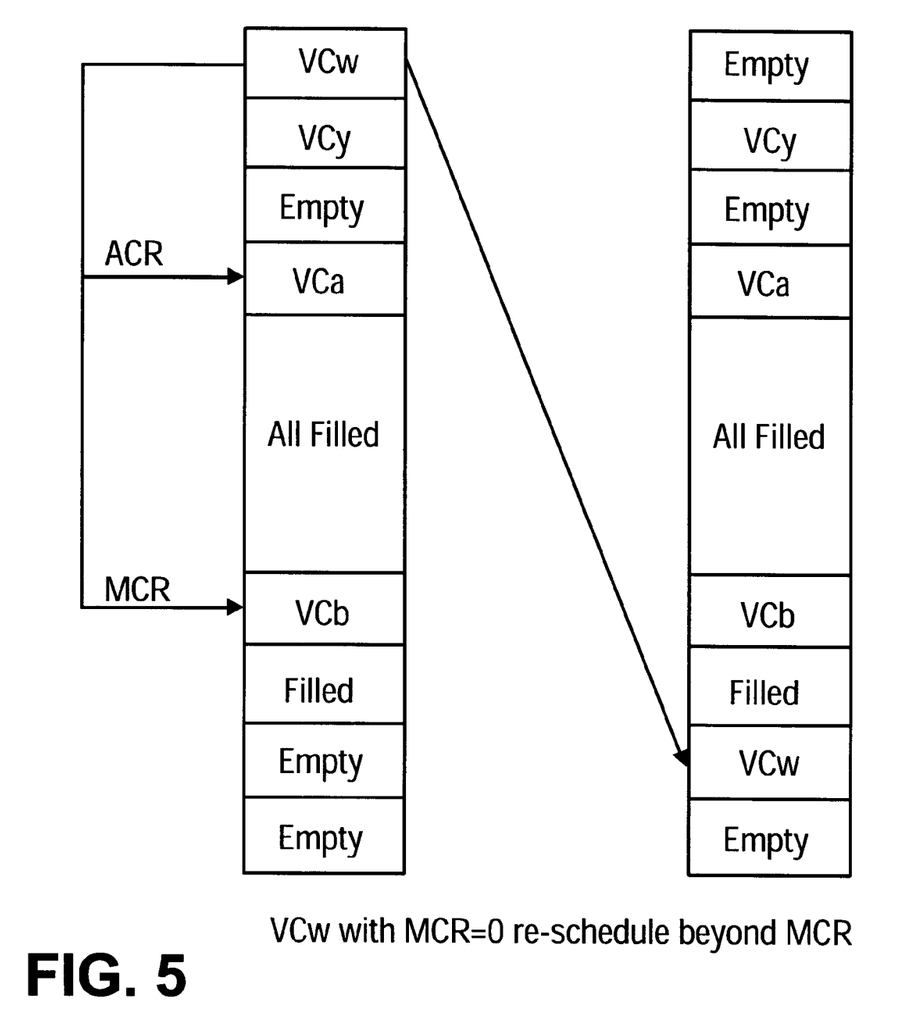
FIG. 5 shows an example of a VC being rescheduled when the MCR for the VC being rescheduled is equal to 0 according to an embodiment of the present invention.

FIGS. 4 and 5 show examples of a VC being rescheduled ($VC_W$ in the Figures) when the VC being rescheduled is not equal to 0, and equal to 0, respectively. With reference to FIG. 4, if all slots between the ACR value and the MCR value for the VC being rescheduled are occupied, and if the MCR field 210 for this VC is equal to 1 (indicating that the VC being rescheduled has an MCR requirement and cannot be kicked), the system searches MCR bitmap 260 to determine if any of the VCs occupying the slots between the ACR value and the MCR value are able to be kicked out. Preferably the first entry found that is equal to 0 in MCR bitmap 260 between the ACR value and MCR value is kicked. Preferably, as shown in FIG. 4, the VC being rescheduled ($VC_W$) swaps positions with the kickable VC ($VC_A$) identified in MCR bitmap 260. Because both slots are occupied, no change is necessary in ACR bitmap 250. However, the two corresponding slots in MCR bitmap 260 must be recalculated to guarantee that any VC with an MCR not equal to 0 will not have its lower bound cell transfer rate violated.

With reference to FIG. 5, if all slots between the ACR value and the MCR value for the VC being rescheduled are occupied, and if the MCR field 210 for this VC is equal to 0 (indicating that the VC being rescheduled has no MCR requirement and can be kicked), the system searches MCR bitmap 260 to determine if any of the slots beyond the MCR value are empty. As shown in FIG. 5, the VC being rescheduled ($VC_W$) is rescheduled in the first available slot. In this case, the original ACR bitmap and MCR bitmap bit locations associated with $VC_W$ are cleared and the new bit location in ACR bitmap 250 corresponding to the slot filled by $VC_W$ is set to 1. In the worst case scenario, $VC_W$ stays in the same time slot.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method comprising:
   indicating with a schedule pointer one of a plurality of sequential Available Bit Rate (ABR) Virtual Connection (VC) entries in a transmission schedule table, each entry representing a time interval for transmission of a cell over a VC identified by the entry;
   transmitting a cell for the VC identified by the entry;
   accessing a Minimum Cell Rate (MCR) bitmap to identify an entry indicating a reschedulable VC occurring after an Allowed Cell Rate (ACR) specified for the VC and not occurring after an MCR specified for the VC;
   moving the reschedulable VC to another entry in the table; and
   moving the VC to the identified entry that had indicated the reschedulable VC.

2. The method of claim 1 further comprising:
   continually updating the schedule pointer to the next sequential entry in the table once the time interval of the indicated entry has elapsed.

3. The method of claim 1 further comprising:
   marking the VC as not reschedulable if a number of times the VC has been moved has reached a threshold number, and marking the VC as reschedulable if the number of times the VC has been moved is lower than the threshold.

4. The method of claim 1, further comprising:
   accessing an ACR bitmap to identify an unoccupied entry occurring after the ACR; and
   wherein accessing the MCR bitmap comprises accessing the MCR bitmap, if there is no unoccupied entry in the ACR bitmap.

5. An article of manufacture comprising a machine-accessible medium having content to provide instructions to cause an electronic system to:
   indicate with a schedule pointer one of a plurality of sequential Available Bit Rate (ABR) Virtual Connection (VC) entries in a transmission schedule table, each entry representing a time interval for transmission of a cell over a VC identified by the entry;
   transmit a cell for the VC identified by the entry;
   accessing a Minimum Cell Rate (MCR) bitmap to identify an entry indicating a reschedulable VC occurring after an Allowed Cell Rate (ACR) specified for the VC and not occurring after an MCR specified for the VC;
   moving the reschedulable VC to another entry in the table; and
   moving the VC to the identified entry that had indicated the reschedulable VC.

6. The article of manufacture of claim 5 further comprising the content to provide instructions to cause the electronic system to:
   continually update the schedule pointer to the next sequential entry in the table once the time interval of the indicated entry has elapsed.

7. The article of manufacture of claim 5 further comprising the content to provide instructions to cause the electronic system to:
   mark the VC as not reschedulable if a number of times the VC has been moved has reached a threshold number, and marking the VC as reschedulable if the number of times the VC has been moved is lower than the threshold.

8. The article of manufacture of claim 5 further comprising the content to provide instructions to cause the electronic system to:
   access an ACR bitmap to identify an unoccupied entry occurring after the ACR; and
   wherein the content to provide instructions to cause the electronic system to access the MCR bitmap comprises content to provide instructions to cause the electronic system to access the MCR bitmap, if there is no unoccupied entry in the ACR bitmap.

9. A network device comprising:
   a memory to store a transmission scheduling table having a plurality of sequential Available Bit Rate (ABR) Virtual Connection (VC) entries, each entry to represent a time interval for transmission of a cell of a VC identified by the entry;
   a memory to store a Minimum Cell Rate (MCR) bitmap comprising bits that each represent an entry in the transmission schedule table;

a scheduler having a schedule pointer to indicate an entry in the table, the scheduler to access the MCR bitmap to identify an entry indicating a reschedulable VC occurring after an Allowed Cell Rate (ACR) specified for the VC and not occurring after an MCR specified for the VC;

move the reschedulable VC to another entry in the table; and move the VC to the identified entry that had indicated the reschedulable VC; and a transmit unit, having a processor to receive from the scheduler an indication by the schedule pointer of the entry in the table from the scheduler, and a transmitter responsive to the processor to transmit a cell for the VC.

10. The apparatus of claim 9 wherein the scheduler continually updates the schedule pointer to the next sequential entry in the table once the time interval of the indicated entry has elapsed.

11. The apparatus of claim 9 wherein the scheduler moves the VC after the transmitter transmits the cell for the VC.

12. The apparatus of claim 9 further comprising the scheduler to mark the VC as not reschedulable if a number of times the VC has been moved has reached a threshold number, and mark the VC as reschedulable if the number of times the VC has been moved is lower than the threshold.

13. The apparatus of claim 12 wherein the scheduler moves the VC if the VC is marked as reschedulable, and the scheduler identifies the entry indicating the VC in the process of identifying a next available entry for a different VC in the table.

* * * * *